Jan. 29, 1957    W. W. McMULLEN ET AL    2,779,431
FILTERING DEVICE
Filed April 8, 1953    2 Sheets-Sheet 2
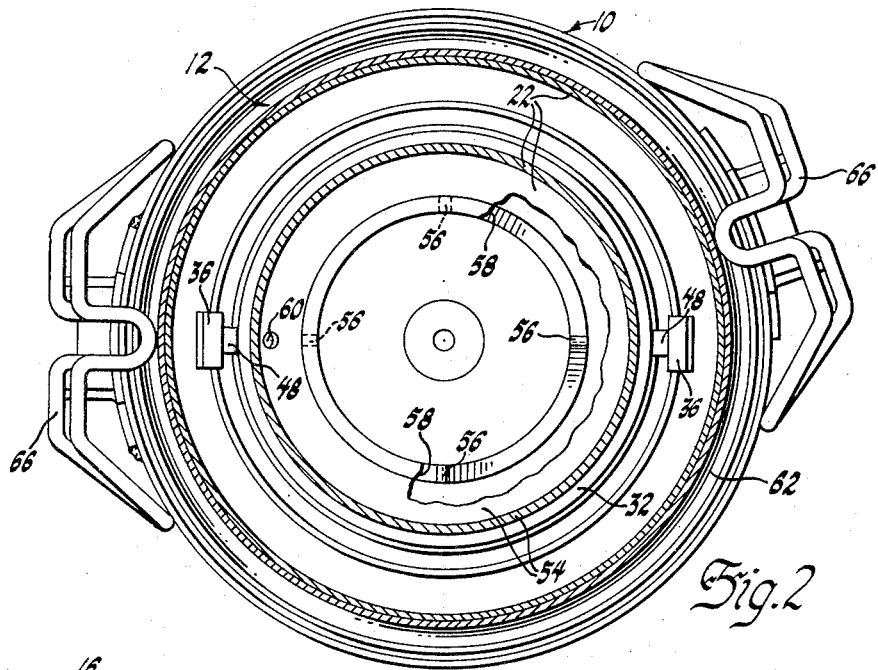
Fig. 2
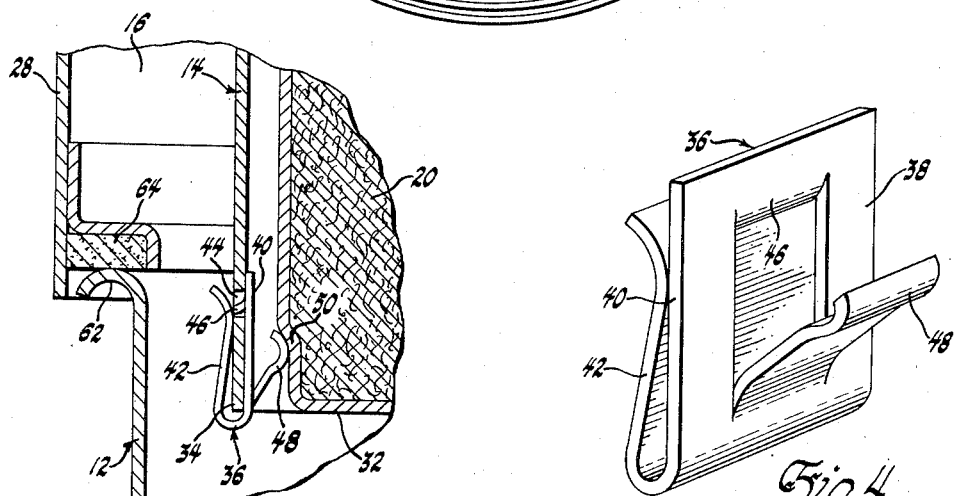
Fig. 3
Fig. 4
INVENTORS
Wesley W. McMullen, &
BY Joseph N. Heller
L. D. Burch
ATTORNEY United States Patent Office 2,779,431
Patented Jan. 29, 1957

2,779,431

FILTERING DEVICE

Wesley W. McMullen and Joseph N. Heller, Flint, Mich., assignors to General Motors Corporation, Detroit, Mich., a corporation of Delaware Application April 8, 1953, Serial No. 347,554

6 Claims. (Cl. 183—15)

This invention relates generally to air cleaners and other similar devices and particularly to filtering, baffling, and securing means adaptable for use with such devices.

Air cleaning and other devices employed on engines, air compressors, and other apparatus used with earth moving, construction, farm, military and similar equipment are subject to unusually severe operating conditions. Such devices are subject to excessive shocks and vibrations and to varying operating positions which tend to disassemble and render inoperative those devices which are not properly constructed. Such devices are also subject to excessive dust and foreign matter usually found in the air during the operation of such equipment and as a result require frequent servicing while the equipment is still in use.

It is now proposed to provide a device which will not be made inoperative as a result of the severe treatment received during the operation of such equipment. It is intended to provide air baffling and filtering means to remove foreign matter and dust from the air used by such devices and to provide fastening means which will rigidly secure these elements in operative position but which permit their removal and replacement when required.

In the drawings:

Figure 2 is a cross-sectional view of the air cleaner as taken in the plane of line 2—2 of Figure 1, viewed in the direction of the arrows thereon. The baffling means is partially broken away to more clearly show certain structural features thereof.

Figure 3 is an enlarged fragmentary view of the air cleaner showing in more detail the means employed for removably securing the filter element within the air cleaner.

Figure 4 is a perspective view of the fastener adapted to be secured to the air cleaner for removably securing the filter element therein.

Figure 1:
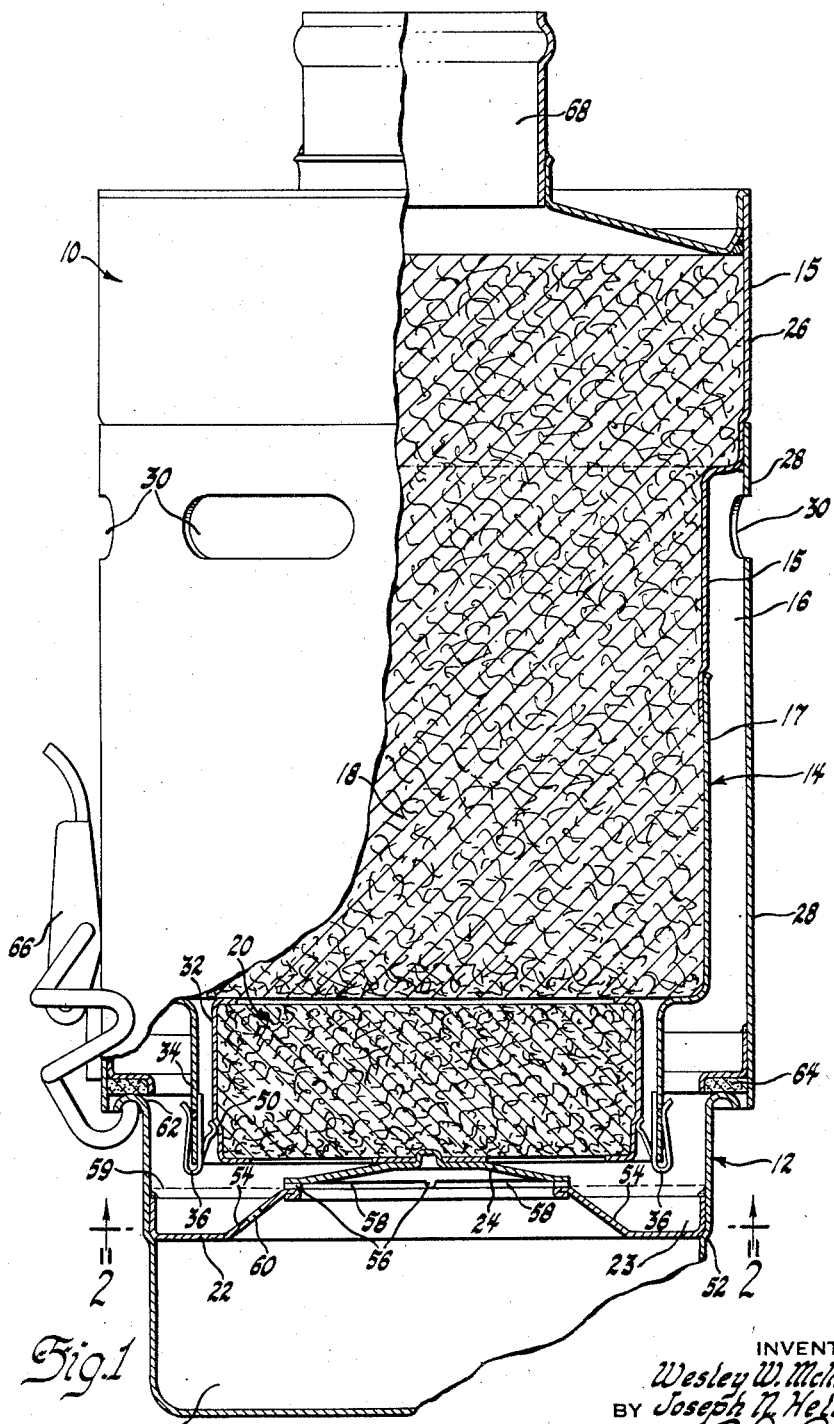
Figure 1 is a side elevational view of an air cleaner partially broken away and cross-sectioned to more clearly show the removable filter element and the baffling and fastening means embracing the invention.

The air cleaner in the accompanying drawings comprises a casing which includes a filter housing member 10 formed by a cylindrical shell 28 disposed about and secured to a sleeve 14 which in the present instance and for the convenience of manufacture is made of sections 15 and 17. The sleeve 14 is enlarged at one end 26 to form part of the housing and the remainder of the sleeve is spaced inwardly from the cylindrical shell 28 to form an annular inlet passage 16. The annular passage 16 communicates with a plurality of openings 30 formed through the cylindrical shell 28 to provide for the induction of air into the passage and through the filter housing.

The sleeve 14 of the filter housing 10 has filter elements 18 and 20 positioned therein adjacent one another. The filter element 18 is formed of material loosely wound or collected to form a filter body disposed within the sleeve 14 near the upper end thereof. The other filter element 20 is formed as a filter cartridge 32 adapted to be removably secured within the lower end of the sleeve 14.

Spring fasteners or resilient elements 36 are adapted to be secured to the sleeve 14 to removably secure the cartridge 32 within the sleeve. The fasteners 36 are formed from spring plate members 38 reversely bent to provide two substantially parallel legs 40 and 42 adapted to receive and engage the end 34 of the sleeve 14. Apertures 44 are formed through the sleeve 14 at positions around the sleeve where the fasteners are to be secured. Tabs 46 are struck from the legs 40 of the fasteners toward the legs 42 and are extended through the apertures 44 in the sleeve to secure the fasteners thereto. Tongues 48 also are struck from the legs 40 in such a way as to extend into the sleeve 14. Tongues 48 engage an annular shoulder 50 formed about the cartridge 32 to secure the cartridge in removable position within the sleeve 14.

The air cleaner casing also includes a liquid container member 12 adapted to be fastened to the filter housing member 10 adjacent the end 34 of the sleeve 14 and in spaced relation to the cartridge 32. Although any suitable fastening means may be used to hold the liquid container 12 in engagement with the filter housing 10, in this instance toggle clamps 66 are adapted to engage an outwardly turned flange 62 formed on the liquid container 12 and to hold the flange in engagement with an annular gasket 64 secured within the housing 10. The liquid container 12 is formed to provide an inwardly projecting shoulder 52 on which a baffle plate 22 is mounted. The baffle plate 22 is formed to provide an annular pan 23 about the liquid container 12 which slopes upwardly at its inner edge towards the filter cartridge 32 as is indicated at 54.

A baffle disc 24 is centrally secured to the filter cartridge 32 and is sloped downwardly and outwardly therefrom toward the inner edge of the baffle plate 22. A plurality of spaced projections 56 are formed on the outer edge of the baffle disc 24 and are adapted to engage the flanged inner edge of the baffle plate 22 to provide a plurality of outlet openings 58 between the baffles and to support the filter cartridge 32 and baffle disc 24 in spaced relation to the baffle plate.

The liquid container 12 is formed to provide a sump 25 adapted to contain a liquid at a level 59. The liquid covers the baffle plate 22 and is adapted to flow through an aperture 60 formed in the baffle plate to fill the annular pan 23.

Assuming that the liquid container 12 is removed and that the filter element 18 is disposed within the filter housing 10, the cleaner is assembled by securing the fasteners 36 to the end 34 of the sleeve 14 and by placing the cartridge 32 within the sleeve in engagement with the fasteners. The liquid container 12 is then filled with liquid and positioned against the filter housing 10 in such a way that the baffle plate 22 engages the baffle disc 24 and the flange 62 of the container 12 engages the gasket 64 of the filter housing 10. The fasteners 36, cartridge 32, and baffles 22 and 24 are held in secure engagement against excessive shocks and vibrations which normally tend to cause rattling and disassembly by means of toggle clamps 66 firmly securing the liquid container 12 to the filter housing 10.

The air cleaner is adapted to be installed on an engine or other apparatus by connecting the air outlet opening 68 formed through the filter housing 10 to the air intake side of such apparatus. Air enters the intake openings 30 of the air cleaner and flows into the inlet passage 16, then downwardly against the pan 23 and upwardly into the filter elements 20 and 18 housed in the sleeve 14. The air traveling through the inlet passage 16 strikes the liquid filled pan 23 and deposits in the liquid some of the dirt and foreign matter carried in the air. The force of the air also causes the liquid in the pan 23 to flow up the sloping portion 54 of the baffle plate 22 and to strike the baffle disc 24. The baffle disc 24 directs the liquid and dirt through the outlet openings 58 formed between the baffles 22 and 24 and into the liquid sump 25. The dirt and foreign matter in the liquid settles to the bottom of the sump 25 allowing the cleaner liquid to flow through the aperture 60 and into the pan 23. The air directed upwardly from the liquid filled pan 23 carries some liquid into the filter elements 20 and 18 where the remainder of the dirt and the entrained liquid are separated out. The liquid collected in the filter elements 20 and 18 returns by gravity through filter elements and flows across the baffle disc 24 carrying dirt and foreign matter through the openings 58 and into the liquid sump 25.

Continuous operation and use of the air cleaner causes the filter element 20 to become filled with dirt and necessitates cleaning or replacing the cartridge 32. The toggle clamps 66 then may be released to allow the liquid container 12 to be removed and the filter cartridge 32 to be pulled from the sleeve 14 and replaced by a cleaner cartridge, after which the liquid container 12 is refastened to the filter housing 10.

We claim:

1. An air cleaner comprising a casing formed of two complementary members adapted to be secured together, a sleeve secured to one of said casing members and spaced inwardly therefrom to form an air inlet passage between said members, a filter element removably secured within said sleeve member, a plurality of fasteners adapted to be secured to said sleeve member, said fasteners engaging said filter element for removably securing said filter element to said sleeve member and adjacent the other of said casing members, a baffle disc secured to said filter element, an annular baffle palte secured to said other casing member and adapted to engage said baffle disc, said other casing member being adapted to contain a liquid at a level partially covering said baffle plate, said baffles being extended transversely across said air inlet passage and in spaced relation to said sleeve member for directing said air into said filter element, and air outlet means formed in said sleeve and through said casing for the exhaust of said air from said filter elements.

2. An air cleaner comprising a casing having a liquid container adapted to be secured thereto, air inlet means formed through said casing for the flow of air therethrough, an air filter element secured within one end of said casing, an air filter cartridge adapted to be secured within the other end of said casing, a plurality of fasteners adapted to be secured to said other end of said casing for removably securing said air filter cartridge to said casing and adjacent said liquid container, a baffle disc centrally secured to said filter cartridge and sloped downwardly and outwardly therefrom, an annular baffle plate secured within said liquid container and sloped upwardly toward said baffle disc, said liquid container being adapted to contain a liquid at a level adapted to partially cover said baffle plate, said baffles being extended transversely across said casing to direct said air into said air filters, and air outlet means formed in said sleeve member and through said casing for the exhaust of said air from said air filters.

3. An air cleaner comprising a casing formed of two complementary members adapted to be secured together, air inlet means formed in said casing for the flow of air therethrough, adjacent filter elements disposed within one of said casing members, one of said filter elements being removably secured to said one casing member adjacent the other of said casing members, a baffle disc secured to said one filter element and sloping downwardly and outwardly therefrom, an annular baffle plate secured within said other casing member and adapted to engage and support said baffle disc and said one filter element, a plurality of spaced projections formed on the outer edge of said baffle disc and adapted to engage said baffle plate, a plurality of openings formed between said projections, said other casing member being adapted to contain a liquid at a level partially covering said baffle plate, said baffles being extended transversely across said other casing member for directing said air into said filter elements, and air outlet means formed through said one casing member for the exhaust of said air from said filter elements.

4. An air cleaner comprising a filter housing having a liquid container adapted to be secured thereto, a sleeve secured near one end of said filter housing and spaced inwardly therefrom to form an annular air inlet passage, air filter elements disposed within said sleeve, spring fasteners secured within said sleeve near one end thereof and being adapted to engage and to removably secure one of said filter elements within said sleeve, a baffle disc secured to said one filter element, an annular baffle plate secured within said liquid container, said baffle disc having a plurality of circumferentially spaced projections formed on its outer edge and being sloped downwardly to engage said baffle plate and to form outlet openings between said baffles, said baffle plate being sloped upwardly to form an annular pan about said liquid container and to support said one filter element thereon, said liquid container being adapted to contain a liquid at a level partially covering said baffle plate and filling said pan, and said baffles being disposed in spaced relation to said sleeve for directing said air through said filter elements.

5. An air cleaner assembly including filter housing and liquid container members adapted to be secured together, air filter means provided within said housing member and depending to within said container member, air passage means formed within said housing and container members for receiving and passing inducted air over the liquid within said container and through said filter means, and means for retaining clean liquid at the surface of said container and for baffling inducted air into said filter means which includes an annular cup provided within said liquid container just below the surface of liquid to be received therein and in the path of said inducted air, a depending baffle disc secured to said depending filter element and cooperatively disposed for spaced peripheral engagement with the internal edge of said annular cup for receiving liquid skimmed over the internal edge of said cup and therebetween into said liquid container, and apertures formed through said cup below the level of liquid within said container for replenishing said cup with more clean liquid therefrom.

6. Air baffling and liquid skimmer means for use with liquid bath air cleaners and the like which include a liquid container member adapted to have a level of liquid therein and a filter housing member having filter means depending within said container, said air baffling and liquid skimmer means including an annular cup provided within said liquid container and disposed just below the level of liquid to be received therein and in the path of air to be inducted thereover, depending baffle means secured to said filter means and disposed for spaced engagement with the peripheral edge of said cup, said baffle means and said cup receiving liquid therebetween which is skimmed from said cup and over the edge thereof into said container by said inducted air, said baffle means being disposed to direct said air into said filter means, and apertures formed through said cup below the level of liquid in said container for the continuous replenishing of said cup with more clean liquid from said container.

References Cited in the file of this patent
UNITED STATES PATENTS

| | | |
|---|---|---|
| 1,926,433 | Cartmell | Sept. 12, 1933 |
| 2,150,745 | Mieras et al. | Mar. 14, 1939 |
| 2,168,472 | Cloud | Aug. 8, 1939 |

(Other references on following page)

UNITED STATES PATENTS

| | | |
|---|---|---|
| 2,234,736 | Larsen | Mar. 11, 1941 |
| 2,251,789 | Hallerberg | Aug. 5, 1941 |
| 2,252,724 | Myers | Aug. 19, 1941 |
| 2,269,663 | Hallerberg et al. | Jan. 13, 1942 |
| 2,406,188 | Beatty et al. | Aug. 20, 1946 |
| 2,513,946 | Kliefoth | July 4, 1950 |
| 2,556,292 | Newcum | June 12, 1951 |
| 2,620,893 | Holt et al. | Dec. 9, 1952 |
| 2,625,722 | West | Jan. 20, 1953 |
| 2,632,929 | Poupitch | Mar. 31, 1953 |
| 2,665,771 | Sebok | Jan. 12, 1954 |
| 2,709,498 | Sebok | May 31, 1955 |

FOREIGN PATENTS

| | | |
|---|---|---|
| 545,089 | Great Britain | May 11, 1942 |